(12) United States Patent
Garrison et al.

(10) Patent No.: US 10,949,731 B2
(45) Date of Patent: Mar. 16, 2021

(54) IDENTIFICATION BADGE HAVING AN RFID LABEL SELECTIVELY POSITIONED THEREIN

(71) Applicant: FineLine Technologies, Norcross, GA (US)

(72) Inventors: Kevin P. Garrison, Suwanee, GA (US); Jan Svoboda, Matthews, NC (US)

(73) Assignee: FineLine Technologies, Norcross, GA (US)

( * ) Notice: Subject to any disclaimer, the term of this patent is extended or adjusted under 35 U.S.C. 154(b) by 0 days.

(21) Appl. No.: 16/452,722

(22) Filed: Jun. 26, 2019

(65) Prior Publication Data

US 2019/0392279 A1 Dec. 26, 2019

Related U.S. Application Data

(60) Provisional application No. 62/690,000, filed on Jun. 26, 2018.

(51) Int. Cl.
*G06K 19/077* (2006.01)

(52) U.S. Cl.
CPC .............. *G06K 19/07758* (2013.01)

(58) Field of Classification Search
CPC .................................. G06K 19/07758
USPC ......................................... 235/492
See application file for complete search history.

(56) References Cited

U.S. PATENT DOCUMENTS

| 2006/0250254 A1 | 11/2006 | Harris et al. | |
| 2008/0278330 A1* | 11/2008 | Hass .............. | G09F 21/02 340/572.8 |
| 2010/0155492 A1* | 6/2010 | Forster .......... | G06K 19/07749 235/492 |

* cited by examiner

*Primary Examiner* — Allyson N Trail
(74) *Attorney, Agent, or Firm* — Shumaker, Loop & Kendrick, LLP (57) ABSTRACT

A prism shaped identification badge having an RFID label selectively positioned therein that is readable by an RFID reading device regardless of the badge's orientation relative to the wearer's body.

20 Claims, 8 Drawing Sheets

IDENTIFICATION BADGE HAVING AN RFID LABEL SELECTIVELY POSITIONED THEREIN

TECHNICAL FIELD

The present invention generally relates to the field of RFID (radio-frequency identification) equipped badges, and more particularly, to RFID badges having an RFID label selectively positioned therein that may be easily read by an RFID reader regardless of badge orientation relative to the wearer's body.

BACKGROUND

Badges and more specifically, identification badges having RFID labels positioned therein are commonly used for selective identification purposes and entrance into events (e.g., music festivals, golf events, museums, etc.), workplaces, etc. However, there is a known problem that occurs when these badges (e.g., planar or flat badges) are worn in close proximity to a wearer's body. Specifically, these badges must be worn with a specific orientation relative to the wearer's body in order to be properly read by an RFID reader. Otherwise, the human body disrupts, limits, and/or stops a UHF/RFID label within the badge from being properly read if the badge is oriented such that the UHF/RFID lays flat, and/or makes contact with the human body because the human body's water content deleteriously acts as a shield preventing and/or limiting an RFID reader's ability to sense the presence of an RFID/UHF label inlay within the badge.

US 2006/0250254 attempted to address the above mentioned problem by attaching an arm onto an outer surface of its badge. This arm protrudes away from the badge and creates space between the badge and further attempts to maintain a predetermined badge position/orientation relative to the badge wearer's body to, in theory, improve badge readability by the RFID reader. However, numerous problems exist with the badge disclosed in US 2006/0250254. First, the arm attached to the badge in US 2006/0250254 is rather cumbersome and is uncomfortable to the wearer when in use. Second, and more importantly, the arm fails to constantly maintain the specifically desired badge orientation, and for this reason, the badge disclosed in US 2006/0250254 can easily flip while in use on a wearer. When flipped, this badge directly contacts the wearer giving rise to the same problems of the above mentioned conventional badges equipped with RFID labels (i.e., limited readability due to the close proximity of the wearer's body specifically associated with the wearer's body water content).

SUMMARY

Therefore, a need exists to provide a badge having an RFID label selectively positioned therein that may be easily read by an RFID reader regardless of badge orientation relative to the wearer's body thereby avoiding the problems of conventional badges with RFID labels.

In certain aspects, the badge utilizes a predetermined shape such that the RFID/UHF label/inlay positioned therein and can be easily read by an RFID reader regardless of the badge's orientation relative to the wearer's body; this predetermined shape preferably includes a polyhedron or a prism shape. In certain aspects, the predetermined shape of the badge is a prism shape including a triangular shape (triangular shaped prism), a box, square or cuboid shape (box, square, or cuboid shaped prism), or a rectangular shape (rectangular shaped prism). In each of these aspects, portions of at least two sidewalls of the badge are spaced apart from one another with an RFID label placed thereon or there between, with this arrangement advantageously aiding and enhancing the RFID label readability regardless of badge orientation while concurrently avoiding the above mentioned problems experienced with conventional badges.

Specifically disclosed are RFID equipped, prism shaped identification badges that include: (a) a first sidewall and a second sidewall that are spaced apart relative to another on a first end of the badge, (b) a bottom sidewall arranged as a base of the badge, the bottom sidewall positioned between and connected to the first and second sidewalls with inner surfaces of each sidewall defining an internal cavity within the RFID equipped identification badge; and (c) an RFID label affixed to the RFID equipped identification badge such that the RFID label may be read in an unencumbered manner by an RFID reader regardless of badge orientation relative to a wearer's body.

In certain aspects, the RFID label is affixed to at least one inner surface of the first sidewall, second sidewall, and/or bottom sidewall defining the internal cavity of the RFID equipped, prism shaped identification badge.

In certain aspects, the RFID equipped, prism shaped identification badge further includes a plurality of RFID labels affixed to the RFID equipped, prism shaped identification badge.

In certain aspects and when a plurality of RFID labels are present, each RFID label is encoded with the same data or with different data.

In certain aspects, the RFID equipped, prism shaped identification badge is triangular shaped (triangular shaped prism), cuboid shaped (cuboid shaped prism), or rectangular shaped (rectangular shaped prism).

In certain aspects, each sidewall of the RFID equipped, prism shaped identification badge is formed of/made from a paper or plastic material.

In certain aspects, the RFID equipped, prism shaped identification badge is configured for temporary or permanent attachment to a retention device on a second end of the badge such that the badge may be worn by the wearer. The retention device is a lanyard for wearing the badge around a wearer's neck or is a retractable badge reel configured for wearing the badge on the wearer's waist.

In certain aspects, the second end of the badge is spaced apart from and opposite to the first end of the badge.

In certain aspects, the identification badge is triangular shaped (triangular shaped prism) with the first and second sidewalls converged (and securely attached to one another— either permanently attached/affixed/bonded to one another or releasably attached to one another) at the second end of the badge forming a vertex of the triangular shaped badge. In this aspect, each RFID label is affixed on different inner surfaces of the first sidewall, second sidewall, and/or bottom sidewall and is encoded with the same data to enhance badge readability regardless of badge orientation. In this aspect, the same data includes at least one of a unique number identifying the badge, orientation of the badge, location of the RFID label in the badge, and a unique number identifying the wearer of the badge.

In certain aspects, the identification badge is triangular shaped (triangular shaped prism) with the first and second sidewalls converged (and securely attached to one another— either permanently attached/affixed/bonded to one another or releasably attached to one another) at the second end of the badge forming a vertex of the triangular shaped badge.

In this aspect, each RFID label is affixed on different surfaces of the RFID equipped, prism shaped identification badge and is encoded with different data. In this aspect, the different data comprises at least two of a unique number identifying the badge, orientation of the badge, location of the RFID label in the badge, and a unique number identifying the wearer of the badge.

In certain aspects, the identification badge is cuboid or rectangular shaped (cuboid prism shaped or rectangular prism shaped) with each of the cuboid or rectangular shaped badges further comprising an upper sidewall that is connected to the first and second sidewalls (securely attached to one another—either permanently attached/affixed/bonded to one another or releasably attached to one another) to form the second end of the badge in which the upper sidewall is parallel or substantially parallel to the bottom sidewall. In this aspect, each RFID label is affixed on different inner surfaces of the first sidewall, second sidewall, bottom sidewall, and/or the upper sidewall and is encoded with the same data to enhance badge readability regardless of badge orientation. In this aspect, the same data comprises at least one of a unique number identifying the badge, orientation of the badge and/or orientation of the RFID label in/on the badge, location of the RFID label in the badge, and a unique number identifying the wearer of the badge.

In certain aspects, the identification badge is cuboid or rectangular shaped (cuboid prism shaped or rectangular prism shaped) with each of the cuboid or rectangular shaped badges further comprising an upper sidewall that is connected to the first and second sidewalls (securely attached to one another—either permanently attached/affixed/bonded to one another or releasably attached to one another) to form the second end of the badge in which the upper sidewall is parallel or substantially parallel to the bottom sidewall. In this aspect, each RFID label is affixed on different surfaces of the RFID equipped, prism shaped identification badge and is encoded with different data. In this aspect, the different data comprises at least two of a unique number identifying the badge, orientation of the badge and/or orientation of the RFID label in/on the badge, location of the RFID label in the badge, and a unique number identifying the wearer of the badge.

In certain aspects, RFID labels are affixed on different inner surfaces of the first sidewall, second sidewall, and/or bottom sidewall that define the internal cavity of the RFID equipped, prism shaped identification badge, and are each encoded with the same data to enhance badge readability regardless of badge orientation, the same data comprising at least one of a unique number identifying the badge, orientation of the badge and/or orientation of the RFID label in/on the badge, location of the RFID label in the badge, and a unique number identifying the wearer of the badge.

In certain aspects, RFID labels are affixed on different surfaces of the RFID equipped, prism shaped identification badge and are each encoded with different data, the different data comprising at least two of a unique number identifying the badge, orientation of the badge and/or orientation of the RFID label in/on the badge, location of the RFID label in the badge, and a unique number identifying the wearer of the badge.

In certain aspects, the disclosed badge may be a triangular shaped identification badge (when viewed from the side or in cross-section) formed of three interconnected walls in which a first and second walls (sidewalls) are indirectly connected to one another by a third wall (bottom sidewall that forms badge base) positioned there between. The first and second walls each have first ends that are configured to converge with one another thereby forming a vertex of the triangular shaped badge, while the third wall is directly connected to a second end of the first and second walls. The third wall forms the base of the triangular shaped badge when the first ends of each wall are converged and is configured to for an UHF/RFID label/inlay to be positioned thereon. The base (bottom sidewall) being flared and having a much greater width that the vertex of the triangular shaped identification badge allows for optimal positioning of the UHF/RFID label/inlay on the third wall/base, which further allows the UHF/RFID label/inlay to remain elevated and spaced apart from the wearer's body thereby consistently maintaining a favorable position for easy detection of the badge's UHF/RFID label/inlay regardless of the badge's orientation relative to the wearer's body.

In certain aspects, each badge disclosed herein can be worn with a lanyard around the wearer's neck or on a wearer's clothing item with a retractable badge reel. In certain aspects, also disclosed are kits including one or more of the above disclosed RFID equipped, prism shaped identification badges prepackaged with a retention device (e.g., a lanyard for wearing the badge around a wearer's neck or is a retractable badge reel configured for retaining the badge on the wearer's waist and/or waistband) configured to retain the badge on a wearer.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

"Polyhedron", "prism", and "prism shaped" as disclosed herein refer to geometric shapes formed by the badge sidewalls. It is to be understood that the polyhedron(s), prism(s), and/or prism shape(s) disclosed herein do not require the badge be solid throughout the entire badge. Thus, the polyhedron and prism shaped badges may include internal cavities formed therein by the badge sidewalls. Furthermore, the internal cavities of the polyhedron and prism shaped badges disclosed herein may be completely enclosed by the sidewalls as further disclosed and depicted herein (i.e., in FIGS. 1-8B), or in certain aspects, certain sidewalls may be omitted, thus forming only partial enclosures defining an internal cavity.

In view of the above, "polyhedron", "prism", "prism shaped", triangular shaped/triangular shaped prism/triangular shaped prism configuration, a box (box shaped prism), square (square shaped prism), cuboid shape (cuboid shaped prism), and/or rectangular shape (rectangular shaped/rectangular shaped prism/rectangular shaped prism) each refer to the three-dimensional shape(s) formed by the sidewall connection(s)/convergence(s) as disclosed and depicted herein.

The badges and, more particularly, the badge sidewalls disclosed herein are, in certain aspects, formed from one unitary, flexible substrate (i.e., a "blank") that is initially coplanar. This flexible substrate may include a flexible, semi-rigid material such as paper or plastic. In certain aspects, the sidewalls of each badge may be interconnected and may be further initially formed as "blanks" in which each sidewall is initially co-planar but is further configured to be folded, along fold lines, into and maintain the polyhedron/prism/prism-shaped configurations/conformations disclosed and depicted herein.

As further disclosed and depicted herein, the disclosed RFID equipped, prism shaped identification badge(s) include RFID label(s) affixed to the badge. The RFID label(s) may be preferably permanently affixed to the badge by an adhesive and/or epoxy that does not affect (i.e., reduce and/or prevent) RF transmission of the information encoded by the RFID label. Each RFID label is encoded with information that can be read by an RFID reader/reading device; this information may include, for example, a unique number identifying the badge, orientation of the badge and/or orientation of the RFID label in/on the badge, location of the RFID label in the badge, information identifying the event being attended and/or to allowance entrance into a predefined location (special event, work, etc.), and/or a unique number identifying the wearer of the badge. As disclosed and depicted further below, a plurality of RFID labels may be included within the disclosed badges. When a plurality of RFID labels are included within the disclosed badge(s), the RFID labels may be encoded with the same or with different information depending on the desired information sought to be transmitted. It should be noted that most RFID tags/labels have a dipole antenna design, which makes the RFID tag orientation sensitive to the reader antenna (although there are tag antenna designs and configurations which create a less orientation sensitive, omni-directional, RF relationship between the tag antenna and the reader antenna). To compensate for this orientation sensitivity, a plurality/multiple RFID tags/labels are, in certain aspects, placed in/on the badge with varied orientations and locations (e.g., some horizontally, some vertically, and/or any other varying positions). The RFID tag in the most favorable orientation (and most favorably positioned to not interfere with the human body) would have the best RF response to the RFID reader antenna, compared to other labels/tags in the badge which may be either in a plane which is against the human body or in an orientation less favorable in relationship to the RFID reader antenna. By knowing the locations and orientations of the RFID labels/tags, and knowing certain details about the RFID reader antenna, other information can be identified about the badge (and potentially the subject wearing the badge).

Specifically referring the Figures, FIGS. 1-8B depict various conformations of the RFID equipped, prism shaped identification badges 100 (e.g., a triangular shaped or triangular shaped prism identification badge or a rectangular shaped or rectangular prism shaped badge respectively) as disclosed herein. As shown within FIGS. 1-8B, each RFID equipped, prism shaped identification badge 100 includes a first sidewall 110 and a second sidewall 120 that are spaced apart relative to another on a first end 116, 126 of the RFID equipped, prism shaped badge. The badge 100 further includes a bottom sidewall 130 arranged as a base of the RFID equipped, prism shaped badge 100 such that the bottom sidewall 130 is positioned between and directly connected to the first and second sidewalls 110, 120 with inner surfaces 114, 124, 134 (and 154 if present) of each sidewall defining an internal cavity within the RFID equipped identification badge 100. The badge further includes at least one RFID label affixed 140 to the RFID equipped, prism shaped identification badge 100 such that the RFID label may be read in an unencumbered manner by an RFID reader regardless of badge orientation relative to a wearer's body. The badge 100 may further include openings 119/129 that are aligned with one another and are configured to receive a retention device therethrough.

Figure 1:
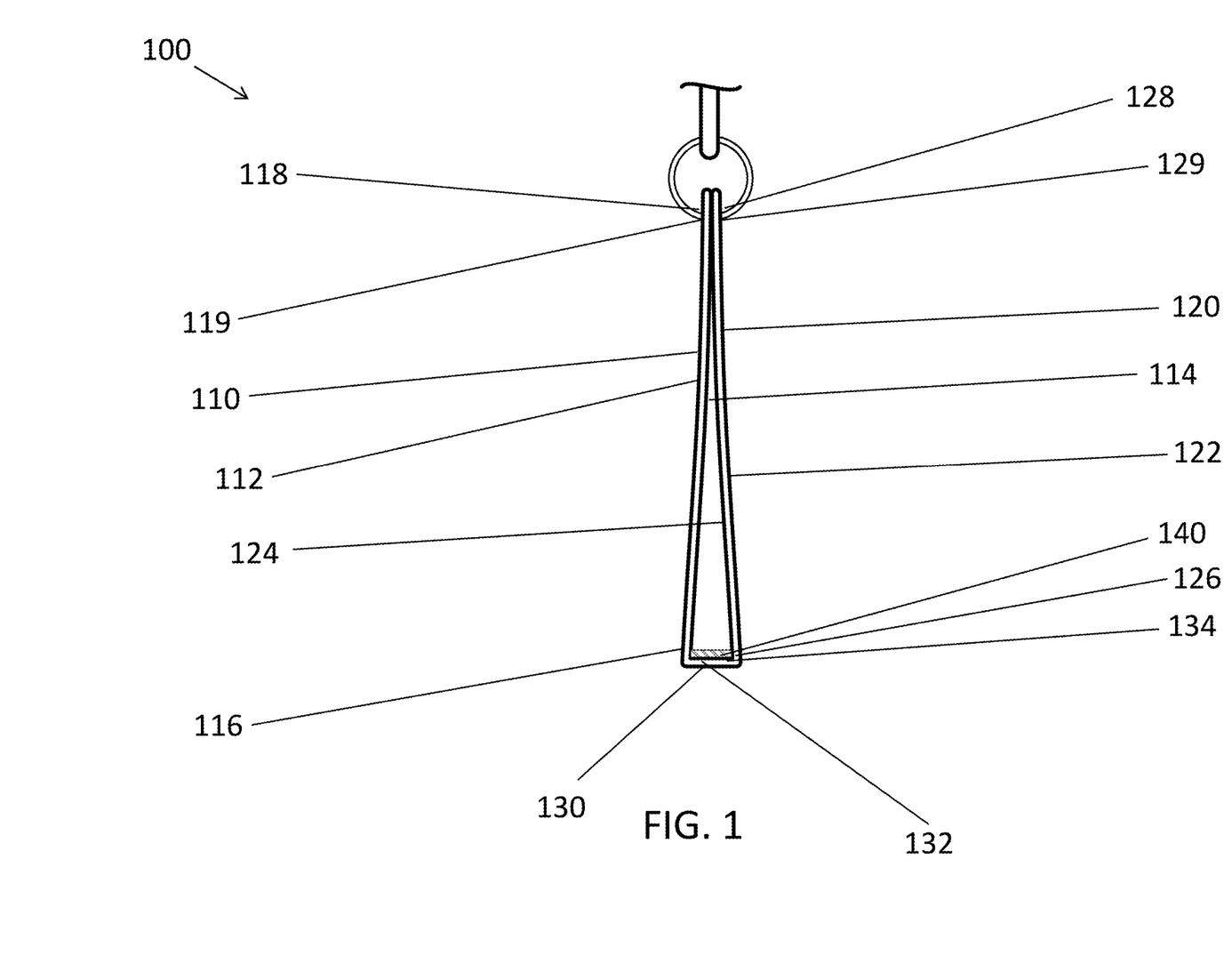
FIG. 1 schematically depicts a side view of an RFID equipped, prism shaped identification badge (triangular shaped or triangular shaped prism configuration)
Figure 2:
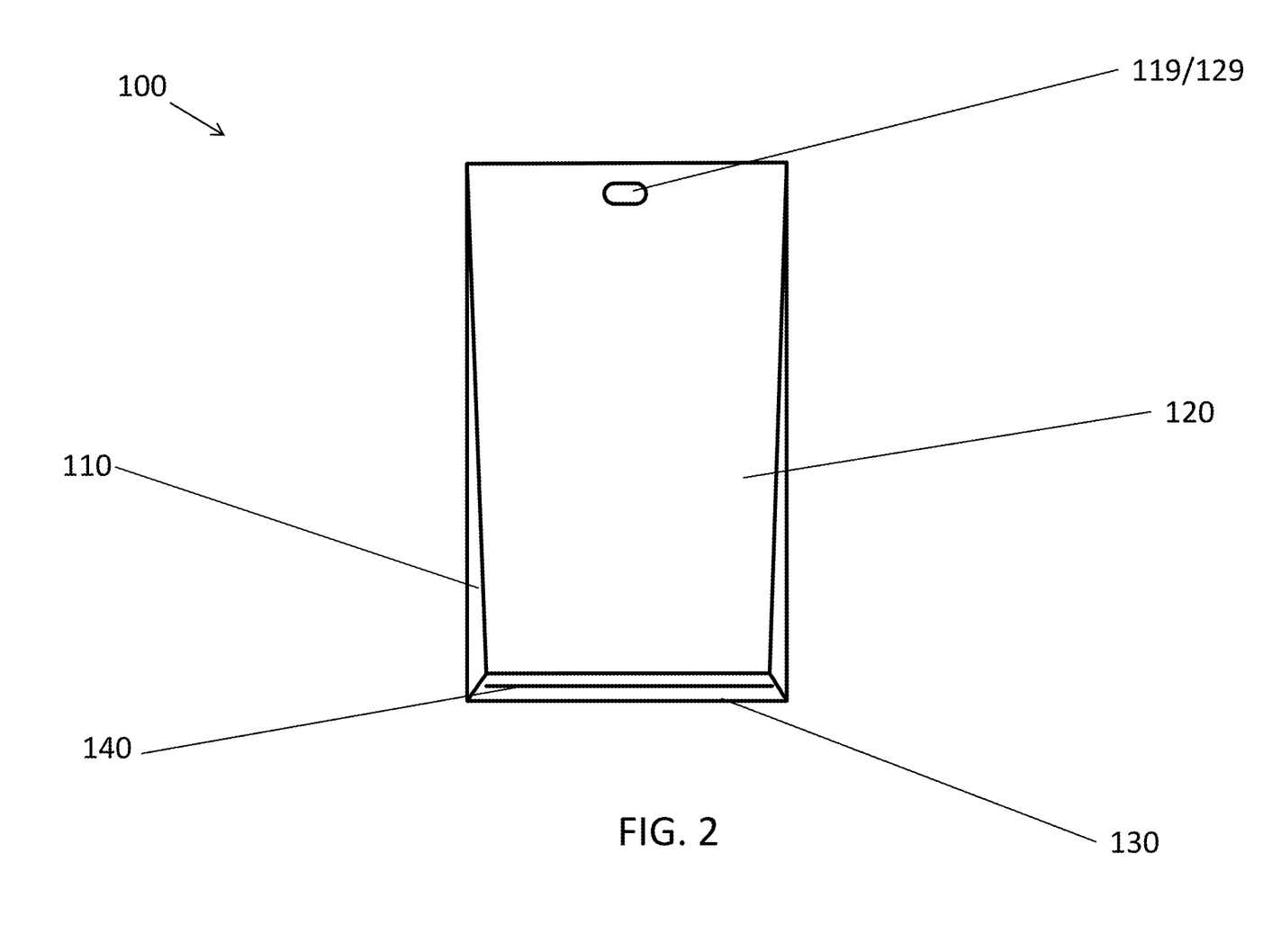
FIG. 2 schematically depicts a front perspective view of an RFID equipped, prism shaped identification badge (triangular shaped or triangular shaped prism configuration)
Figure 3:
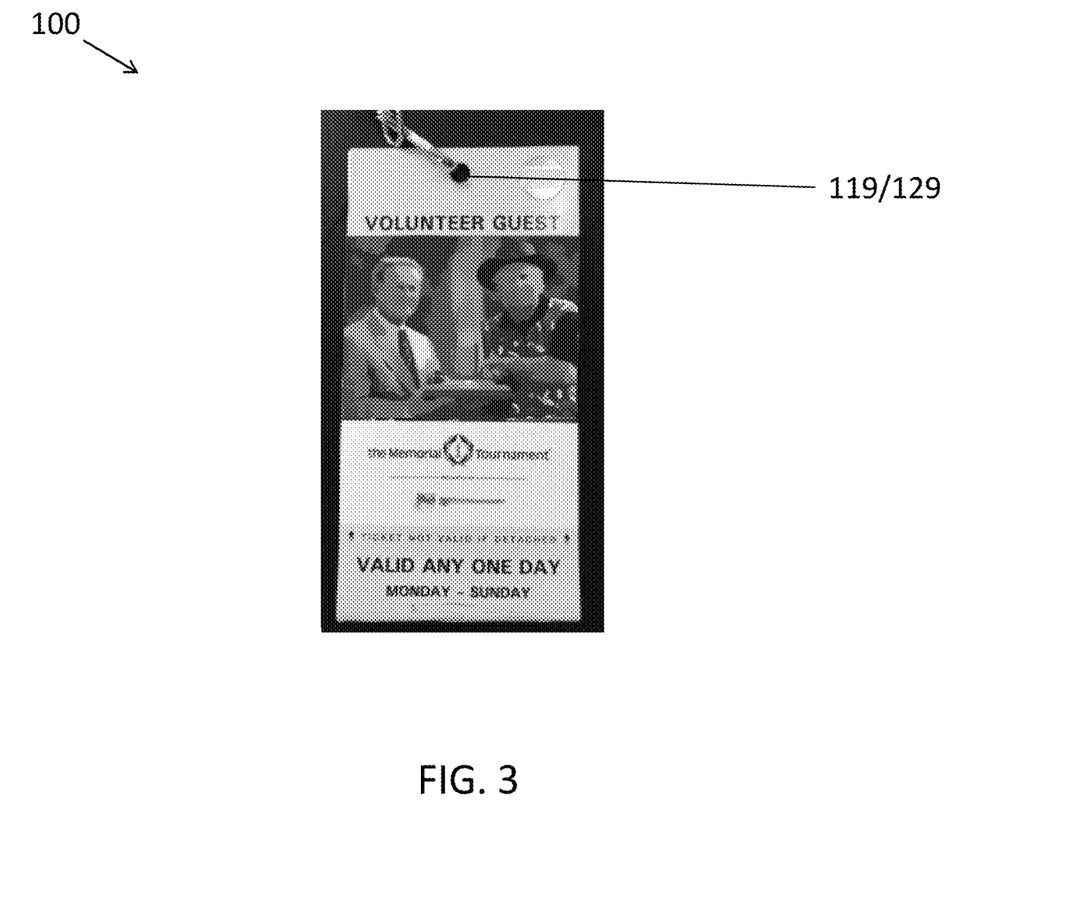
FIG. 3 is a photograph of an exemplary RFID equipped, prism shaped identification badge (triangular shaped or triangular shaped prism configuration) with various indicia printed thereon.
Figure 4:
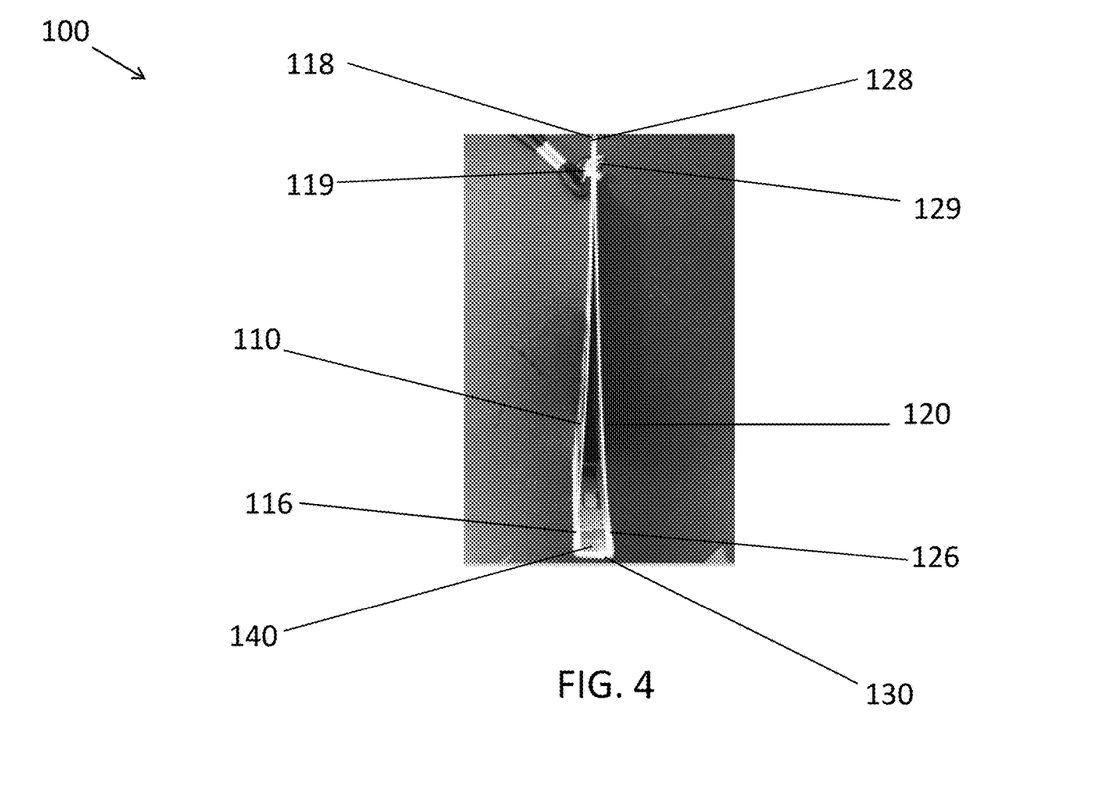
FIG. 4 is a photograph of a side view of the exemplary identification badge shown in FIG. 3.
Figure 5:
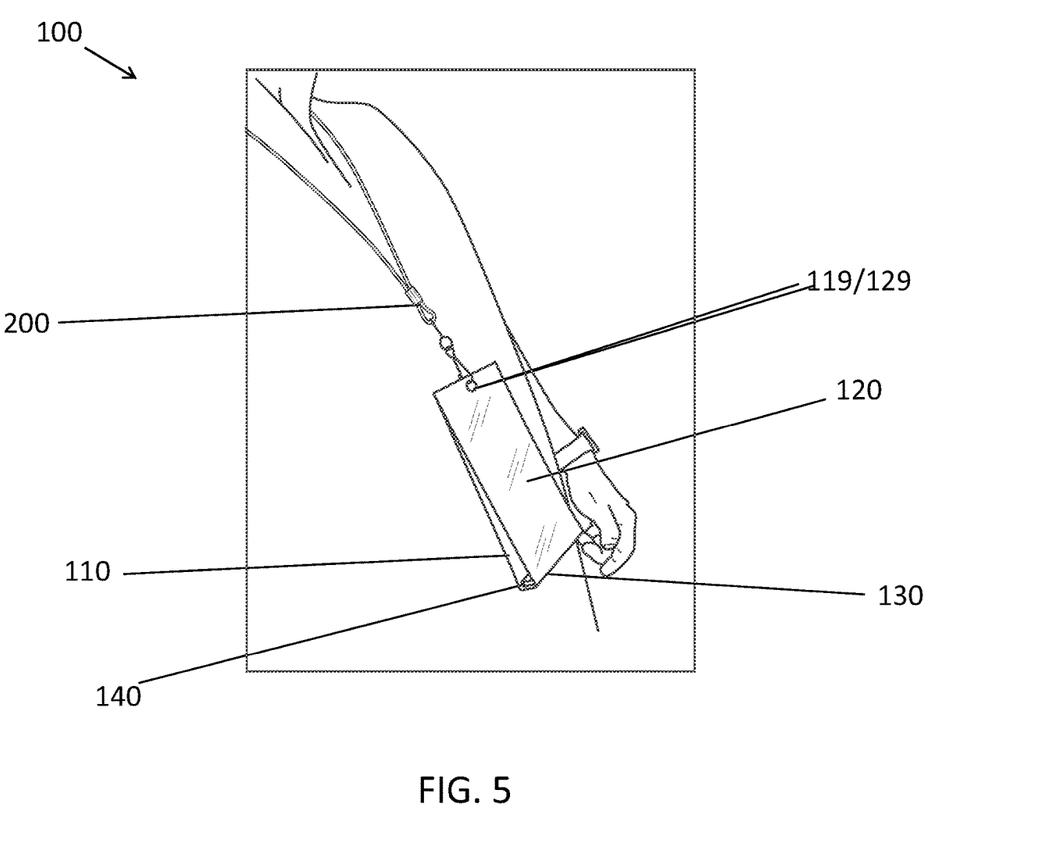
FIG. 5 is a photograph depicting an environmental view of the identification badge shown in FIGS. 3 and 4 being worn by a user.
Figures 6A, 6B, 6C:
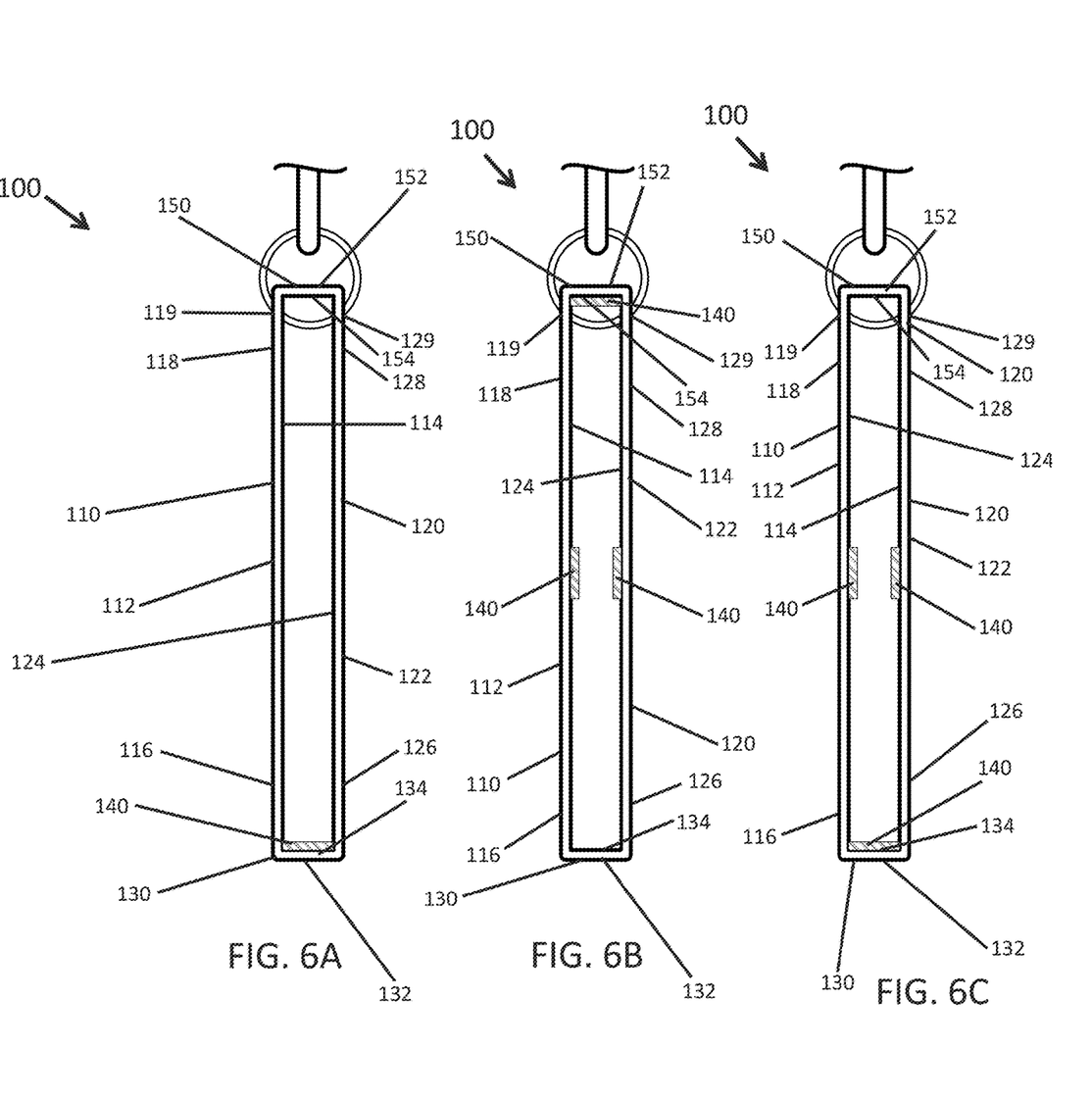
FIG. 6A depicts a side view of an RFID equipped, prism shaped identification badge (rectangular shaped of rectangular shaped prism configuration) according to one embodiment having an RFID label affixed to a bottom sidewall of the badge.
FIG. 6B depicts a side view of an RFID equipped, prism shaped identification badge (rectangular shaped of rectangular shaped prism configuration) according to another embodiment having a plurality of RFID labels selectively affixed to various sidewalls of the badge.
FIG. 6C depicts a side view of an RFID equipped, prism shaped identification badge (rectangular shaped of rectangular shaped prism configuration) according to yet another embodiment having a plurality of RFID labels selectively affixed to various sidewalls of the badge.
Figure 7A:
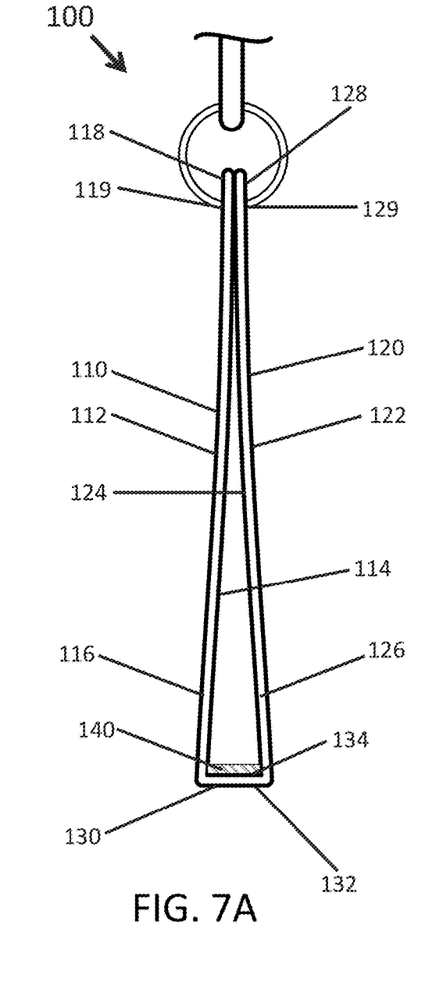
FIG. 7A depicts a side view of an RFID equipped, prism shaped identification badge (triangular shaped or triangular shaped prism configuration) according to one embodiment having an RFID label affixed to a bottom sidewall of the badge.
Figure 7B:
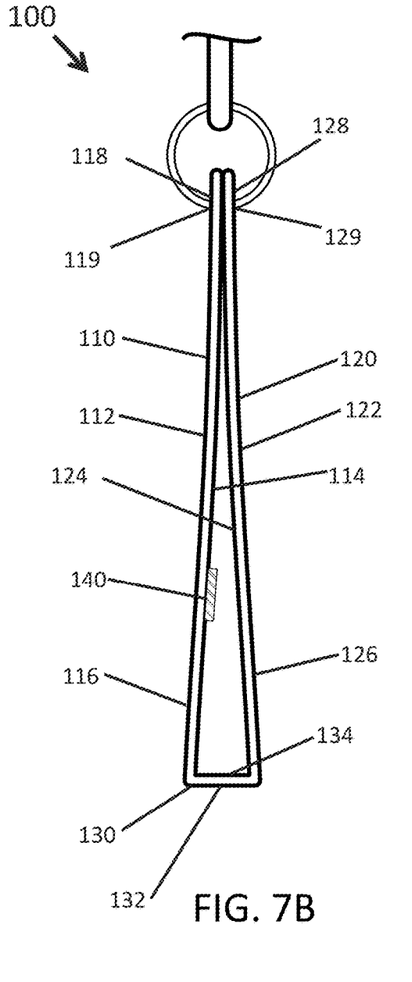
FIG. 7B depicts a side view of an RFID equipped, prism shaped identification badge (triangular shaped or triangular shaped prism configuration) according to another embodiment having an RFID labels selectively affixed to a sidewall of the badge.
Figure 7C:
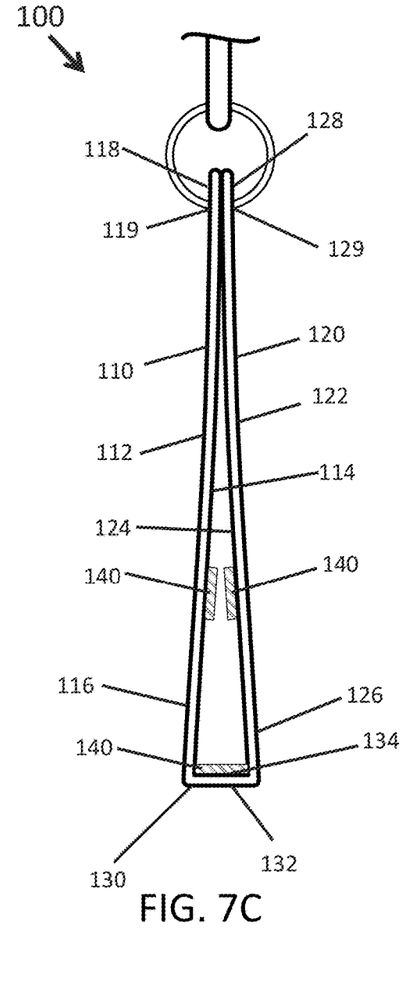
FIG. 7C depicts a side view of an RFID equipped, prism shaped identification badge (triangular shaped or triangular shaped prism configuration) according to yet another embodiment having a plurality of RFID labels selectively affixed to various sidewalls of the badge.
Figure 8A:
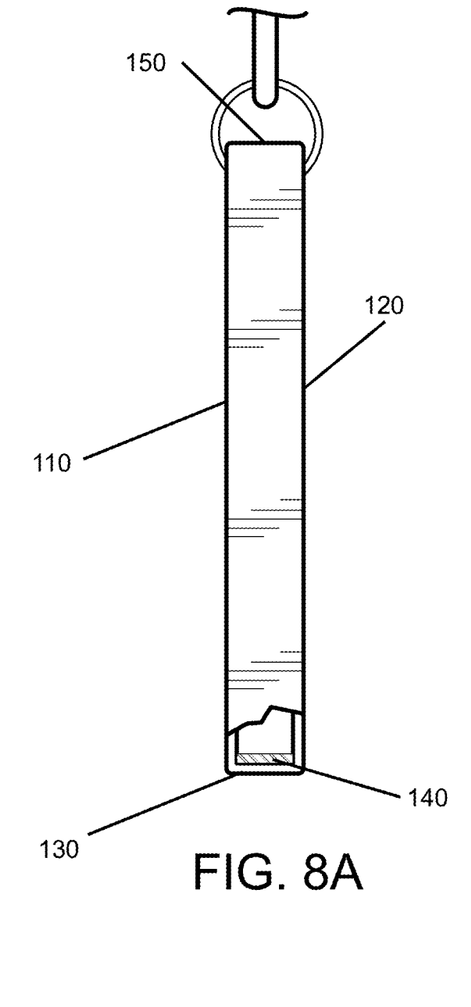
FIG. 8A depicts a side view of an RFID equipped, prism shaped identification badge (rectangular shaped or rectangular shaped prism) having an RFID label affixed to an inner surface of the sidewalls and being completely enclosed by the sidewalls defining an internal cavity of the badge.
Figure 8B:
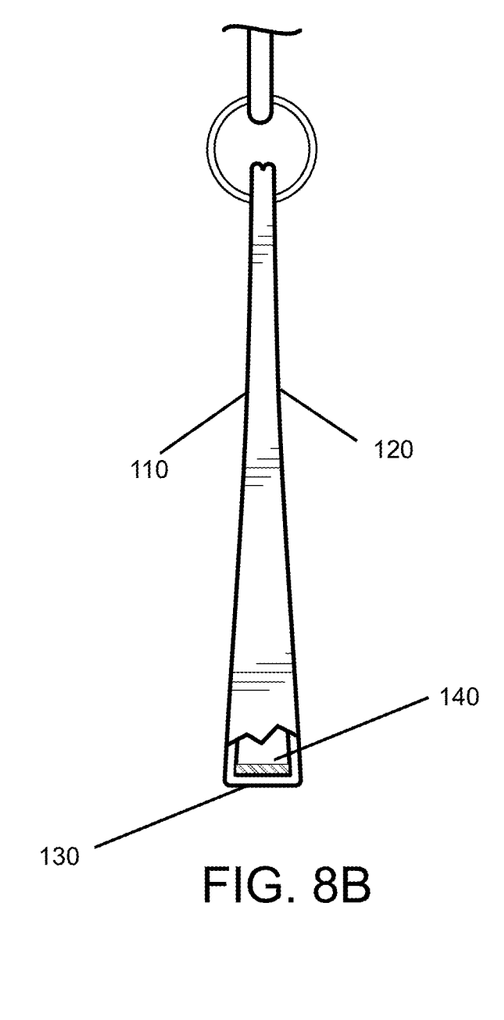
FIG. 8B depicts a side view of an RFID equipped, prism shaped identification badge (triangular shaped or triangular shaped prism) having an RFID label affixed to an inner surface of the sidewalls and being completely enclosed by the sidewalls defining an internal cavity of the badge.

FIGS. 1-5, 7A-7C, and 8B each depict the triangular shaped conformation/configuration of the RFID equipped, prism shaped identification badge 100 disclosed herein. Specifically, FIGS. 1, 2, 7A-7C, and 8B schematically depict various different arrangements of the triangular shaped identification badge 100 having one of more RFID labels 140 affixed thereto while FIGS. 3-5 are photographs further depicting exemplary triangular shaped identification badges 100 having desired indicia (e.g., desired nomenclature, photographs, and/or graphic depictions) provided thereon.

With specific reference to FIGS. 1 and 2, the RFID equipped, prism shaped identification badge 100 (triangular shaped or triangular prism shaped identification badge configuration) includes first and second sidewalls 110, 120 that are connected to one another by a bottom sidewall 130 positioned there between and having an UHF/RFID label 140 (referred to hereafter as "RFID label") positioned and/or affixed on the bottom sidewall 130.

The first sidewall 110 includes an outer surface 112 that is positioned on the outside of the badge 100 and may have desired indicia (e.g., desired nomenclature, photographs, and/or graphic depictions) provided/printed thereon, an inner surface 114 that is positioned inside the badge when the second ends 118, 128 of each wall 110, 120 are converged, a second end 118 that is configured to form a vertex of the triangular shaped identification badge 100 when converged with a second end 128 of the second sidewall 120, and a first end 118 that directly connects with the bottom sidewall 130. The first sidewall 110 further includes opening 119 configured to align with opening 129 of the second wall when the second ends 118, 128 of each wall (110, 120) is converged and, as shown in FIG. 5, is further configured to securely receive a retention device (e.g., lanyard 200) therethrough.

Similarly and as further shown in FIGS. 1 and 2, the second sidewall 120 includes an outer surface 122 that is positioned on the outside of the badge 100 and may have desired indicia (e.g., desired nomenclature, photographs, and/or graphic depictions) provided/printed thereon, an inner surface 124 that is positioned inside the badge when the second ends 118, 128 of each sidewall 110, 120 are converged to form the vertex of the RFID equipped, prism shaped identification badge 100 (triangular shaped/triangular prism shaped identification badge configuration/conformation), a second end 128 that is configured to form a vertex of the RFID equipped, prism shaped identification badge 100 (triangular shaped/triangular prism shaped identification badge configuration/conformation) when converged with a second end 118 of the first wall 110, and a first end 126 that directly connects with the bottom sidewall 130. The second sidewall 120 further includes opening 129 configured to align with opening 119 of the first wall when the second ends 118, 128 of each sidewall 110, 120 are converged and as shown in FIG. 5 is further configured to securely receive a lanyard therethrough.

As alluded to above, the bottom sidewall 130 is positioned between and directly connected to the spaced apart first ends 116, 126 of the first and second sidewalls 110, 120. The bottom sidewall 130 includes an outer surface 132 that is positioned on the outside of the badge 100 and an inner surface 134 that is positioned inside the badge when the second ends 118, 128 of the first and second sidewalls 110, 120 are converged to form the vertex of the RFID equipped, prism shaped identification badge 100 (i.e., in the triangular shaped/triangular prism shaped identification badge). In certain aspects and as further shown in FIGS. 1 and 7A, the RFID label 140 is affixed to and above the inner surface 134 of the bottom sidewall 130 such that the RFID label is positioned within an internal cavity formed and defined by converged first and second sidewalls 110, 120. As further shown in FIGS. 7B and 7C, in certain desired aspects, RFID label 140 positioning may be varied such that one or more RFID labels 140 may be positioned/affixed within and/or on the RFID equipped, prism shaped identification badge 100 (triangular shaped or triangular prism shaped identification badge). For example, when a plurality of RFID labels 140 are present, one or more RFID labels may be affixed to any inner surface 114, 124, 134 of the first, second, and bottom sidewalls (in the triangular shaped or triangular prism shaped identification badge). Regarding the RFID labels depicted in FIGS. 7A-7C, each of these RFID labels may encode for the same information or may be encoded with different information in which this encoded information identifies the badge, orientation of the badge and/or orientation of the RFID label in/on the badge, location of the RFID label in the badge, and/or a unique number identifying the wearer of the badge. When multiple RFID labels affixed to the badge 100 are encoded with the same information, this arrangement/configuration serves as a form of redundancy further enhancing the signal of the information being transmitted and further ensuring that badge orientation will not adversely affect badge operability when being read by an RFID reader.

As shown in FIGS. 1, 3, 4, and 5, the bottom sidewall 130 forms the base of the RFID equipped, prism shaped identification badge 100 (triangular shaped or triangular shaped prism identification badge). When compared to the vertex of the triangular shaped identification badge the base 130 is substantially planar and flared having considerably greater width than the vertex (e.g., two-times greater width, three-times greater width, four-times greater width, five-times greater width, six-times greater width, seven-times greater width, eight-times greater width, nine-times greater width, ten-times greater width). The overall shape and width differential of the base relative to the vertex of the triangular shaped identification badge advantageously maintains sufficient spacing/positioning between the triangular shaped identification badge 100 (and more specifically the RFID label affixed to the third wall 130) and a wearer's body such that the RFID label may be easily read by an RFID reader regardless of an orientation of the triangular shaped identification badge relative to the wearer's body.

FIG. 5 further depicts an environmental view of the RFID equipped, prism shaped identification badge 100 (triangular shaped or triangular prism shaped identification badge) being worn by a wearer. Specifically, lanyard 200 is secured to the badge openings 119/129, and the lanyard with the badge 100 secured thereto is placed around the wearer's neck such that the badge is secured to and hangs from the wearer's neck. As shown in FIG. 5 and as discussed above, the RFID label 140 in badge 100 is easily readable by an RFID reader regardless of whether the first wall 110 or second wall 120 is in closest proximity to the wearer's body due to the arrangement of the first, second, and third walls 110, 120, 130 as disclosed herein.

FIGS. 6A-6C and FIG. 8A depict another configuration/conformation of the RFID equipped, prism shaped identification badge 100. Specifically and as further shown in FIGS. 6A-6C and FIG. 8A, box (box shaped prism), square (square shaped prism), cuboid shape (cuboid shaped prism), and/or rectangular shape (rectangular shaped/rectangular shaped prism/rectangular shaped prism conformations of the RFID equipped, prism shaped identification badge 100 are further envisioned. As shown in FIGS. 6A-6C and 8A, these configurations are substantially similar to the above disclosed triangular shaped or triangular prism shaped identification badge configurations and specifically include a first sidewall 110, second sidewall 120, and bottom sidewall 130 along with corresponding outer and inner surfaces arranged in a substantially similar manner as those previously disclosed above regarding the triangular shaped or triangular prism shaped identification badge configurations. However, as further shown in FIGS. 6A-6C and FIG. 8A, these RFID equipped, prism shaped identification badges 100 further include an upper sidewall 150 that connects to the second ends 118, 128 of the respective first 110 and second 120 sidewalls. As further shown in FIGS. 6A-6C and 8A, the inner surfaces 114, 124, 134, and 154 of the first 110, second 120, bottom 130, and upper 150 sidewall define an internal cavity within the badge. As further shown in FIGS. 6A-6C, RFID labels 140 may be positioned in and/or on the badge in a substantially similar manner as previously described above but may further include an RFID label affixed to the upper sidewall 150 (e.g., inner surface 154 of upper sidewall). When a plurality of RFID labels are present therein, these RFID labels may encode for the same or different information as previously disclosed above and for the same purpose and advantageous reasons as those previously described above.

In certain aspects, the RFID equipped, prism shaped identification badges disclosed herein may be partially enclosed and/or define a partially enclosed internal cavity as depicted in FIG. 4. However, in certain aspects and as further depicted in FIGS. 8A and 8B, the internal cavity may be completely enclosed by a plurality of sidewalls having inners surfaces that further define a completely enclosed internal cavity. In this aspect, the all sidewalls may be formed by the unitary, flexible substrate (or blank) that is initially coplanar as disclosed above and is subsequently folded/formed into the badge, or alternatively, in certain aspects, inserts may be provided that attach to the badge and are arranged as sidewalls to form a completely enclosed badge.

In certain aspects, also disclosed are kits including one or more of the RFID equipped, prism shaped identification badges 100 depicted in FIGS. 1-8B that are prepackaged with a retention device (e.g., a lanyard 200 for wearing the badge around a wearer's neck or is a retractable badge reel (not shown) configured for retaining the badge on the wearer's waist and/or waistband) configured to retain the badge on a wearer.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

PARTS LIST

RFID equipped, prism shaped identification badge 100
First Sidewall 110
Outer Surface of First Sidewall 112
Inner Surface of First Sidewall 114
First End of First Sidewall 116
Second End of First Sidewall 118
Opening 119/129
Second Sidewall 120
Outer Surface of Second Sidewall 122
Inner Surface of Second Sidewall 124
First End of Second Sidewall 126
Second End of Second Sidewall 128
Bottom Sidewall/Third Sidewall 130 (Base)
Outer Surface of Bottom Sidewall/Third Sidewall 132
Inner Surface of Bottom Sidewall/Third Sidewall 134
RFID Label(s) 140
Upper Sidewall/Fourth Sidewall 150
Outer Surface of Upper Sidewall/Fourth Sidewall 152
Inner Surface of Upper Sidewall/Fourth Sidewall 154
Lanyard 200

What is claimed is:

1. An RFID equipped, prism shaped identification badge comprising:
    (a) a first sidewall and a second sidewall that are spaced apart relative to another on a first end of the RFID equipped, prism shaped badge,
    (b) a bottom sidewall directly connected to the first and second sidewall by fold lines, the bottom sidewall arranged as a base of the RFID equipped, prism shaped badge, the bottom sidewall positioned between and connected to the first and second sidewalls with inner surfaces of each sidewall defining an internal cavity within the RFID equipped identification badge; and
    (c) a plurality of RFID labels affixed internally within the RFID equipped, prism shaped identification badge to an inner surface of the first sidewall, second sidewall, and/or bottom sidewall such that each RFID label is positioned in separate planes of the RFID equipped, prism shaped identification badge such that at least one of the plurality of RFID labels may be read in an unencumbered manner at any time by an RFID reader regardless of badge orientation relative to a wearer's body.

2. The RFID equipped, prism shaped identification badge of claim 1, wherein the RFID label is affixed to the inner surface of the first sidewall, the inner surface of the second sidewall, and the inner surface of the bottom sidewall defining the internal cavity of the RFID equipped, prism shaped identification badge.

3. The RFID equipped, prism shaped identification badge of claim 1, wherein each RFID label is encoded with the same data or with different data.

4. The RFID equipped, prism shaped identification badge of claim 3, wherein the RFID equipped, prism shaped identification badge is triangular shaped, cuboid shaped, or rectangular shaped.

5. The RFID equipped, prism shaped identification badge of claim 4, wherein each sidewall comprises a paper or a foldable plastic material.

6. The RFID equipped, prism shaped identification badge of claim 5, wherein the RFID equipped, prism shaped identification badge is configured for temporary or permanent attachment to a retention device on a second end of the RFID equipped, prism shaped badge such that the RFID equipped, prism shaped badge may be worn by the wearer.

7. The RFID equipped, prism shaped identification badge of claim 6, wherein the second end of the RFID equipped, prism shaped badge is spaced apart from and opposite to the first end of the RFID equipped, prism shaped badge.

8. The RFID equipped, prism shaped identification badge of claim 7, wherein the RFID equipped, prism shaped badge is triangular shaped with the first and second sidewalls converged at the second end of the badge forming a vertex of the triangular shaped badge.

9. The RFID equipped, prism shaped identification badge of claim 8, wherein each RFID label is affixed on different inner surfaces of the first sidewall, second sidewall, and/or bottom sidewall and is encoded with the same data to enhance badge readability regardless of badge orientation.

10. The RFID equipped, prism shaped identification badge of claim 9, wherein the same data comprises at least one of a unique number identifying the badge, orientation of the badge and/or orientation of the RFID label in/on the badge, location of the RFID label in the badge, and a unique number identifying the wearer of the badge.

11. The RFID equipped, prism shaped identification badge of claim 8, wherein each RFID label is affixed on different surfaces of the RFID equipped, prism shaped identification badge and is encoded with different data.

12. The RFID equipped, prism shaped identification badge of claim 11, wherein the different data comprises at least two of a unique number identifying the badge, orientation of the badge and/or orientation of the RFID label in/on the badge, location of the RFID label in the badge, and a unique number identifying the wearer of the badge.

13. The RFID equipped, prism shaped identification badge of claim 7, wherein the RFID equipped, prism shaped badge is cuboid or rectangular shaped with each of the cuboid or rectangular shaped badges further comprising an upper sidewall that is connected to the first and second sidewalls that forms the second end of the badge.

14. The RFID equipped, prism shaped identification badge of claim 13, wherein each RFID label is affixed on different inner surfaces of the first sidewall, second sidewall, bottom sidewall, and/or the upper sidewall and is encoded with the same data to enhance badge readability regardless of badge orientation.

15. The RFID equipped, prism shaped identification badge of claim 14, wherein the same data comprises at least one of a unique number identifying the badge, orientation of the badge and/or orientation of the RFID label in/on the badge, location of the RFID label in the badge, and a unique number identifying the wearer of the badge.

16. The RFID equipped, prism shaped identification badge of claim 13, wherein each RFID label is affixed on different surfaces of the RFID equipped, prism shaped identification badge and is encoded with different data.

17. The RFID equipped, prism shaped identification badge of claim 16, wherein the different data comprises at least two of a unique number identifying the badge, orientation of the badge and/or orientation of the RFID label in/on the badge, location of the RFID label in the badge, and a unique number identifying the wearer of the badge.

18. The RFID equipped, prism shaped identification badge of claim 1, wherein RFID labels are affixed on different inner surfaces of the first sidewall, second sidewall, and/or bottom sidewall that define the internal cavity of the RFID equipped, prism shaped identification badge, and are each encoded with the same data to enhance badge readability regardless of badge orientation, the same data comprising at least one of a unique number identifying the badge, orientation of the badge, location of the RFID label in the badge, and a unique number identifying the wearer of the badge.

19. The RFID equipped, prism shaped identification badge of claim 1, wherein RFID labels are affixed on different surfaces of the RFID equipped, prism shaped identification badge and are each encoded with different data, the different data comprising at least two of a unique number identifying the badge, orientation of the badge and/or orientation of the RFID label in/on the badge, location of the RFID label in the badge, and a unique number identifying the wearer of the badge.

20. A kit comprising:
one or more of the RFID equipped, prism shaped identification badges of claim 1 prepackaged with a retention device configured to retain the badge on a wearer.

* * * * *